United States Patent [19]
Greene

[11] Patent Number: 6,139,726
[45] Date of Patent: Oct. 31, 2000

[54] TREATED WATER DISPENSING SYSTEM

[75] Inventor: Ralph G. Greene, Dalton, Ga.

[73] Assignee: UV Cooling Technologies, Dalton, Ga.

[21] Appl. No.: 09/326,234

[22] Filed: Jun. 4, 1999

Related U.S. Application Data

[63] Continuation-in-part of application No. 09/222,040, Dec. 29, 1998, abandoned.

[51] Int. Cl.$^7$ .................................................. B01D 17/12
[52] U.S. Cl. .............................. 210/94; 210/97; 210/175; 210/192; 210/257.1; 250/434; 250/436; 222/146.1; 422/186.3
[58] Field of Search ............................. 222/146.1, 146.6, 222/189.06; 250/429, 434, 436, 438; 210/85, 86, 94, 95, 97, 175, 192, 257.1, 257.2, 748; 422/24, 186.3

[56] References Cited

U.S. PATENT DOCUMENTS

| | | | |
|---|---|---|---|
| 4,322,291 | 3/1982 | Ho | 250/438 |
| 5,064,097 | 11/1991 | Brog et al. | 222/146.1 |
| 5,192,004 | 3/1993 | Burrows | 222/146.1 |
| 5,316,673 | 5/1994 | Kohlmann et al. | 210/257.1 |
| 5,441,179 | 8/1995 | Marsh | 210/748 |
| 5,484,538 | 1/1996 | Woodward | 210/257.1 |
| 5,573,142 | 11/1996 | Morellato et al. | 222/146.1 |
| 5,766,453 | 6/1998 | Morellato et al. | 210/257.2 |
| 5,928,506 | 7/1999 | Bae | 210/257.1 |

*Primary Examiner*—Joseph W. Drodge
*Attorney, Agent, or Firm*—Alan Ruderman; Stephen J. Stark

[57] ABSTRACT

A water treatment tank for use with water purification apparatus including an ultra-violet lamp within a bulb onto which incoming water is directed to provide a 360 degree thin laminar flow about the bulb so that all of the incoming water receives the ultra-violet rays even when water is dispensed in a fast refill fashion. The tank may have two compartments, one above the other, formed by a separating baffle. The lower compartment has cooling coils about the walls for cooling the water therein relative to the water in the upper compartment. The ultra-violet lamp and a bulb extends through both compartments and the baffle to purify the water. Each compartment communicates through a conduit to a respective dispensing faucet of the water purification apparatus. The conduit from the upper compartment is a transparent tube formed from polytetrafluorethylene so that the ultra-violet rays act on water within the tube. The bulb in one embodiment is vented at both the top and bottom so that air may circulate around the lamp. In another embodiment the separating baffle is eliminated and the water level within the tank is controlled by a conductivity sensor to ensure that the water within the tank is above the level of the transparent tube so that room temperature water may be dispensed through the tube.

24 Claims, 4 Drawing Sheets

TREATED WATER DISPENSING SYSTEM

REFERENCE TO RELATED APPLICATIONS

This application is a continuation-in-part of U.S. application Ser. No. 09/222,040 filed Dec. 29, 1998, now abandoned.

BACKGROUND OF THE INVENTION

Water purification devices which purify at slow rate, such as those which use the distillation and the reverse-osmosis processes, deliver water into a storage tank or reservoir from which the water is dispensed. The same is true in regard to systems which use bottled water and water filter dispensing coolers. The water, however, may be easily contaminated with bacteria by contact with air on the storage and dispensing mechanisms, or merely by sitting stagnant in the reservoir. This is particularly true with bottled water cooler dispensers and those units that are used as replacements for bottled water cooler dispensers since the tanks are non-pressurized, and therefore must be vented to permit water to be dispensed by gravity flow.

A known method for eliminating bacterial contamination is the use of ultra-violet ("UV") light. The light energy from a UV lamp is germicidal, because UV light penetrates microbial organism's protective membrane layer and photochemically damages the DNA structure, disabling its self-reproducing capability and rendering the cell lifeless.

UV light is in the region of the electromagnetic spectrum that lies between visible light and X-rays. The ultra-violet spectrum ranges from 100 nm to 400 nm wave lengths, with the optimum effective range between 250 nm to 270 nm. The UV lamp is commonly housed in a protective sleeve of quartz which is similar to a test tube that allows ultra-violet transmission and separates the lamp and wiring from the water surrounding the lamp. The quartz sleeve also helps the UV lamp to maintain its optimal operating temperature of approximately 105° F. Factors that determine a UV system's effectiveness include the intensity of the lamp, the exposure time of the water to the ultra-violet rays and the water transmission rate which is determined by the quality and color of the water.

The typical storage reservoir for water purification units is not suitable for effective UV application. In gravity-filled storage reservoirs, there must be a method for controlling the water level within the reservoir, and typically a float valve or switch is used. With a UV bulb inside the reservoir, a float valve or switch will normally act as an obstruction to the UV light rays, and provide a sheltered location for bacterial contamination to grow. A typical size and storage capacity for a point of use reservoir is in the order of approximately 4 to 6 gallons, which is required to compensate for the slow recovery rate of the purification system. Since UV has a limited effective transmission distance, the physical dimensions of a 4 to 6 gallon storage reservoir have not been suitable for effective UV application. A very high intensity UV lamp would be required in such cases and this would heat the chilled water thereby reducing the efficiency and effectiveness of the chilling process. Moreover, UV degrades most plastics, and typically in large reservoirs, floats and switches are constructed of plastic. A typical point of use and bottled water dispenser reservoir is divided into two compartments by an internal baffle that separates the water which has been cooled from the water that is still at room temperature. Two faucets are used, one for dispensing room temperature water and the other for dispensing chilled water. The baffle that separates the cold and room temperature sections blocks UV rays from reaching one of the compartments in such systems.

It was pointed out in the aforesaid copending patent application that the known prior art has not solved any of these problems. In Marsh U.S. Pat. No. 5,441,179, an apparatus is shown for disinfecting water in a water cooler holding tank using a UV lamp in the form of a collar incorporated within the bottle positioning collar on top of the base where the neck of the bottle is inverted to dispense water into the holding tank. The problem with a system of this type is that substantially all of the bottled water dispensers on the market today are designed to dispense water at both room temperature and at a chilled temperature. To separate the different temperature compartments an internal baffle is used to form a barrier between upper and lower portions of the holding tank, the lower portion being cooled externally by a cooling means such as a compressor system or thermal-electric cooling system. Water is drawn from above the baffle to dispense room temperature water, and water is drawn from the base of the holding tank to dispense chilled water, taking advantage of the natural temperature inversion. The UV lamp located above the water line in the holding tank has substantially no beneficial sterilization effects on water located below the baffle. A major cause of bacterial contamination of water in holding tanks is a build up of bacterial "slime coat" on the tank walls, which provide a breeding ground and contact point for water to be dispensed. Any water dispensed from below the baffle in this arrangement would pass through a non-treated area of the tank and become contaminated. Moreover, a UV lamp placed above the water line has only one side of the UV lamp exposed toward the water to be treated and is not as effective as an immersed UV lamp that exposes the water to the full 360 degrees of the lamp output. Placing a lamp in the center of a storage tank also lowers the required UV light transmission distance by half. Furthermore, since UV light degrades most plastics and since most bottles are constructed from plastic, exposing the neck of the water bottle either directly or indirectly to UV light will have an adverse effect on the bottle material over time. Additionally, harmful UV light may be transmitted to the eyes of a person while a plastic bottle is being changed.

In Kohlman and Karmain U.S. Pat. Nos. 5,316,673 and 4,276,256 respectively, a UV lamp is located within dispensing apparatus to sterilize water as it is being dispensed. Bacterial growth that occurs inside the storage tank, and the build up of bacterial "slime coat," which can be the cause of bad tasting and smelling water, however, will not be remedied by treatment with UV light as the water is being dispensed. In Valadez U.S. Pat. No. 4,969,991, a subsystem for circulating water from a reservoir through a microbial sterilizer (such as UV) periodically utilizes a pump to recirculate the water out of the holding tank through the UV in-line filter and back to the holding tank. Again, bacterial growth that can occur on the inside of the holding tank surfaces is not affected since UV treated water has no residual anti-bacterial properties.

In Sherman, U.S. Pat. No. 5,389,254, a purification system is disclosed which is coupled to a pressurized holding tank with a UV lamp and a diaphragm, the diaphragm being rubber and located at the base of the holding tank to maintain pressure in the tank and to deliver the water. Again, UV light is destructive to most plastic and to rubber materials. An internal diaphragm would create shaded areas between the diaphragm and the tank walls providing an area for growth of bacteria in the holding tank thereby making the holding tank a source of contamination.

In Ho, U.S. Pat. No. 4,322,291, an apparatus is disclosed having a horizontally placed UV lamp inside a tank with a series of concentric plates, the function of the plates being to effect a uniform water flow across the horizontally placed UV lamp.

In Dung, U.S. Pat. No. 5,675,973, a purifier is disclosed wherein water under pressure is forced through a number of filters, the last one being a UV filter. Woodward, U.S. Pat. No. 5,484,538 is similar.

Hamlin, U.S. Pat. No. 5,112,477, shows vending machine apparatus with water UV being treated just prior to dispensing, while Matsumoto, U.S. Pat. No. 5,321,908, discloses placing germ killing antibacterial material in a holding tank.

Accordingly, the prior known art has not solved the problems heretofore noted. These problems are the result of water sitting stagnant for a time in a reservoir. When water is constantly flowing, there is little, if any, chance for bacterial buildup, but when water is stagnant, contamination may readily occur.

In my aforesaid copending patent application a water dispensing system for dispensing room temperature and chilled water included an ultraviolet purifying tank having a separating baffle separating the tank into a room temperature water compartment and a chilled water compartment, the tank carrying a UV energy source extending into both compartments, the treatment tank having no ultraviolet light blocking obstacles so that substantially all of the rays reach the water. The ultraviolet source preferably is a UV lamp in a quartz sleeve positioned in the center of the treatment tank so that the output of a full 360 degrees of the rays reach the water. Thus, there are two compartments, each holding water at a different temperature, and the UV lamp is mounted such as to be disposed in each compartment. To prevent the ultraviolet light from being blocked by components that may itself be at a location to shelter bacteria growth, such as a float valve or switch, the proposal used an external control providing a simple float level control mounted within a housing separated from the treatment tank. However, although such a system provides satisfactory results in a large dispensing apparatus, in smaller systems such as coolers, the use of an external level control is impracticable. Moreover, it is highly desirable to utilize an ultraviolet lamp having low power requirements. A problem also results when water is flowing through the system under full flow conditions because some of the water may not receive ultraviolet light rays for a sufficient time, and this is significant if the water has not previously been purified. A system using a high wattage lamp, as aforesaid, requires additional power to cool the water which is to be chilled. Thus, there is a two fold effect on the power requirements of the system when a UV lamp having a high power requirement is used.

SUMMARY OF THE INVENTION

Consequently, it is a primary object of the present invention to provide a water dispensing system for dispensing room temperature and chilled water which has been treated and purified by an ultraviolet source.

It is another object of the present invention to provide a water treatment tank having an ultraviolet energy source therein for effectively decontaminating both room temperature and chilled water which may be contained therein, the tank receiving water from a clean water source such as a distillation/condensation purifier, a point of use filtration source, a reverse osmosis purifier or a bottled water source.

It is a further object of the present invention to provide a water dispensing system including a treatment tank having an ultraviolet (UV) energy source in the form of a lamp for purifying the water therein, the water entering the tank in a manner permitting fast refill while still permitting all the water to contact the lamp.

It is a still further object of the present invention to provide a water dispensing system including the treatment tank having an ultraviolet (UV) energy source in the form of a lamp for purifying the water therein, the tank having a separating baffle for separating the tank into a room temperature compartment and a chilled water compartment with the lamp extending into both compartments, and additionally having the water in the room temperature compartment being exposed to UV rays while awaiting being dispensed just prior to exiting the tank.

It is a yet still further object of the present invention to provide a water dispensing system including a treatment tank having an ultraviolet (UV) energy source in the form of a lamp for purifying the water therein, the tank having a separating baffle for separating the tank into a room temperature compartment and a chilled water compartment, the lamp being mounted so that heat generated thereby is vented both at the top and bottom of the tank so that the effect on the chilled water by the heat generated from the lamp is reduced.

It is a still further object of the present invention to provide a water dispensing system including a treatment tank having an ultra-violet energy source in the form of a lamp for purifying the water therein, the water entering the tank in a manner such that a thin film laminar flow of the water contacts the lamp so that only a small volume of room temperature water is required to be stored in the tank for immediate dispensing, thereby eliminating the need for a baffle separating room temperature water from chilled water.

Accordingly, the present invention provides a water dispensing system wherein the water is treated by ultraviolet rays in a treatment tank to purify the water prior to being dispensed. Water entering into the treatment tank is directed so that it is channeled onto the UV lamp where it flows about the sleeve of the lamp in a thin film greatly increasing the ultraviolet exposure so that a low energy lamp may be effective even under full flow conditions. The treatment tank may have separating baffle which separates room temperature water from chilled water and the ultraviolet lamp extends into both compartments. Moreover, a transparent tube preferably formed from polytetrafluorethylene (e.g. Teflon) or the like extends through the chilled water compartment below the baffle and communicates the room temperature water with the outlet faucet therefor. The water in the tube is thus radiated by the ultraviolet light emanating from the bulb while the room temperature water is within the tube waiting to be dispensed.

Another aspect of the present invention is the provision of enclosing the UV lamp within a quartz tube which vents externally at both the top and bottom of the tank.

A further aspect of the invention is to utilize a polytetrafluorethylene tube disposed about the UV lamp so as to minimize fouling of the UV lamp enclosure.

Yet another aspect of the present invention permits the level of the water in the storage tank to be lowered to a small amount above the inlet to the room temperature outlet tube permitting immediate dispensing, thereby eliminating the need for the baffle. A level controller which maintains the level of the water at a minimum above the inlet to the outlet tube insures that a sufficient amount of water is available for immediate dispensing.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
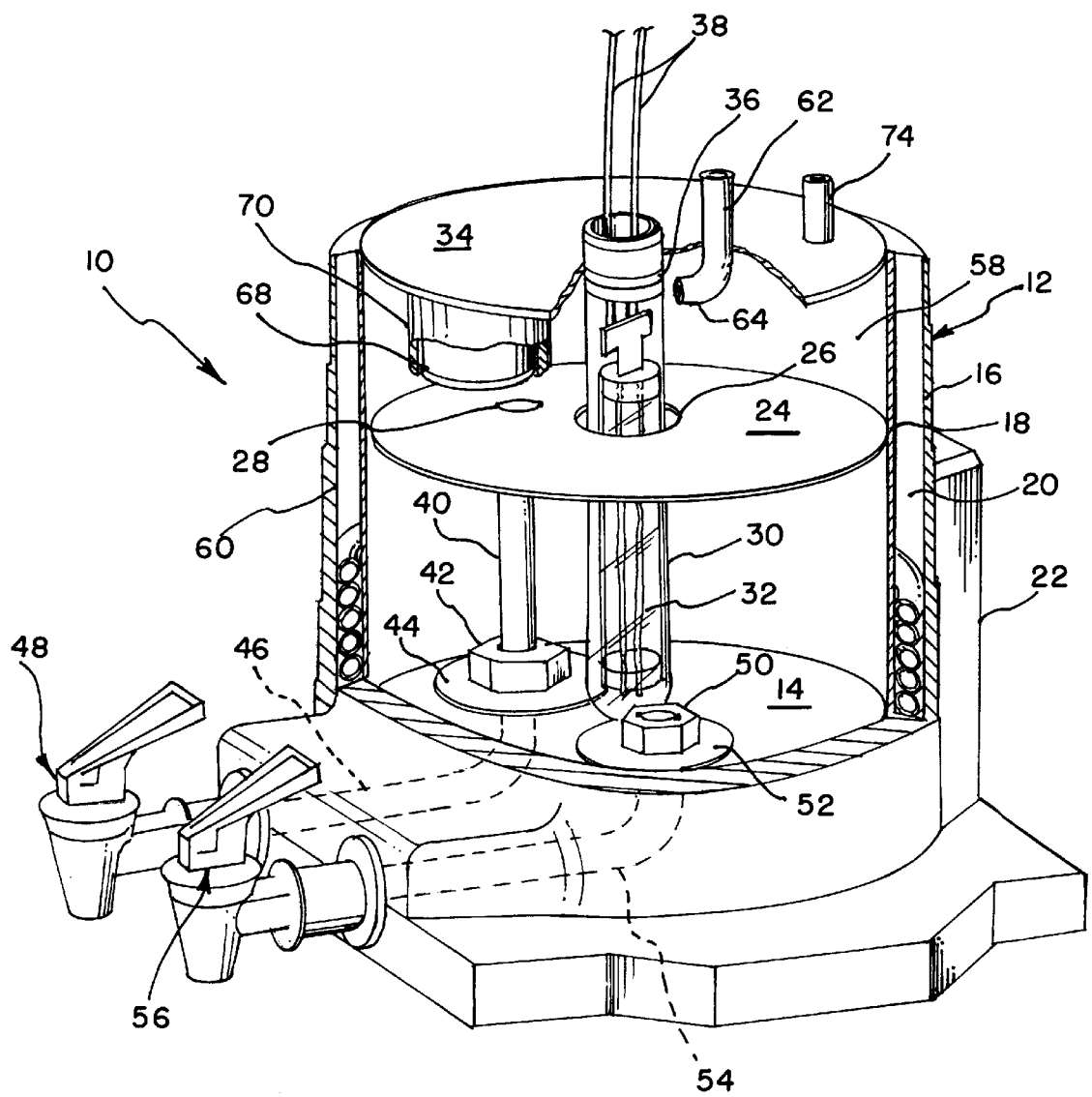
FIG. 1 is a perspective view partly broken away and sectioned of a water dispenser incorporating features constructed in accordance with the principles of the present application.

Referring now to the drawings, FIG. 1 illustrates a water dispenser 10 incorporating water treatment apparatus constructed in accordance with the present invention. The dispenser 10 includes a housing 12 having a hollow interior including a base 14 and an exterior upstanding wall 16. In at least the lower portion of the housing above the base spaced inwardly from the wall 16 is a second wall 18. Tubing forming cooling coils 20 are received in a coiled condition between the walls 16 and 18, the coils 20 carrying coolant communicating with refrigeration apparatus (not illustrated) mounted within a bulbous portion 22 of the housing 12 preferably externally of the wall 16 for reasons which will hereinafter become clear.

Fastened to the interior wall 18 within the hollow interior of the dispenser is a baffle plate 24, the baffle plate preferably being constructed from stainless steel and having a substantially central opening 26 and a smaller offset opening 28. Extending downwardly through the opening 26 and having portions disposed both above and below the baffle 24 is an outer bulb 30 in which an ultraviolet lamp 32 is mounted, the bulb being a conventional fused quartz bulb such as a test tube. The bulb 30 extends through an upper lid 34 which covers and closes the hollow interior of the dispenser and the bulb is closed at the upper end by a seal or grommet or other closure member 36 through which electrical conductors 38 pass outwardly to an electrical source (not illustrated).

Also extending through the baffle plate 24 is a transparent tube 40 which preferably is formed from polytetrafluoroethylene sold under the trademark TEFLON. The tube 40 permits UV rays to pass therethrough and is not deteriorated by these rays. The tube 40 extends into and through a nut 42 and through a washer 44 beneath the nut into the base where it communicates through tubing 46 connected to the nut 40 with a manually operable faucet valve 48. Another nut 50 positioned on a washer 52 communicates through tubing 54 with another manually operable faucet valve 56.

Figure 2:
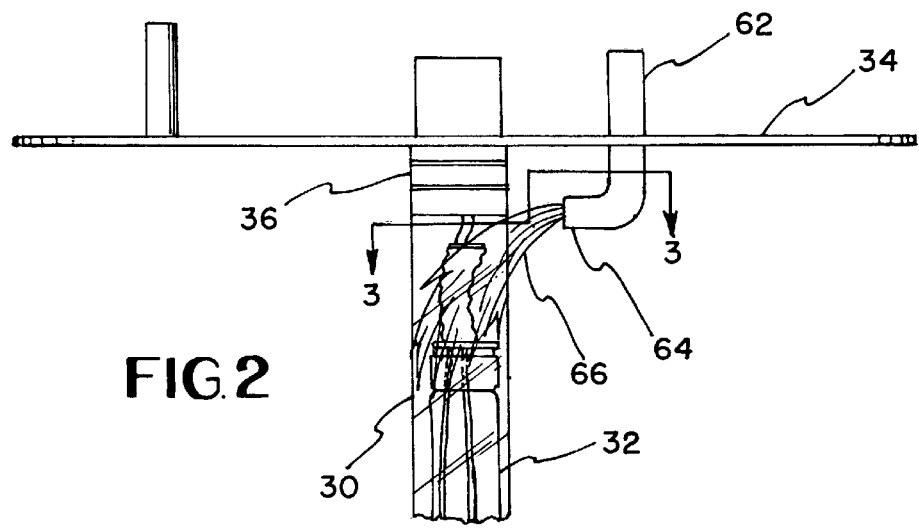
FIG. 2 is a fragmentary elevational view of the top portion of the dispenser illustrated in FIG. 1.
Figure 3:
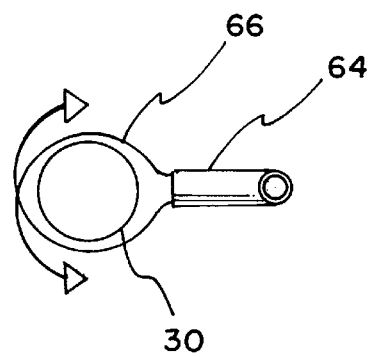
FIG. 3 is a cross sectional view taken substantially along line 3—3 of FIG. 2.

The baffle plate 24 divides the interior of the dispenser 10 into an upper compartment 58 and a lower compartment 60. Secured to the lid 34 and extending into the upper compartment 58 is a water supply tube 62 which may be connected to a source of potable water, which may be filtered water or bottled water. The end of the tube 62 within the dispenser is bent or angled at 64 so that the water 66 exiting the tube 62 is directed onto the bulb 30 about the ultraviolet lamp 32 which, as illustrated in FIGS. 2 and 3, provides a 360 degree thin film laminar flow about the bulb. This acts to transfer heat from the bulb to the incoming water and permits use of a low wattage ultra-violet lamp and also insures that all of the water entering the dispenser is treated by the UV light rays.

Mounted within the upper chamber 58 carried by the lid 54 is a float switch 68 mounted within a shield 70. As is the case with the baffle 24, the shield 70 and the nuts 42, 50 and washers 44, 52 are constructed from stainless steel so as not to be affected by the ultra-violet rays. A vent tube 74 opening outwardly of the dispenser communicates air to the dispenser so that the water within the dispenser may flow by gravity.

As described, all of the elements within the dispenser are constructed from quartz, stainless steel or Teflon which do not deteriorate as a result of the ultra-violet rays of the lamp 32. Moreover, the room temperature water within the upper compartment 58 communicates with the manually operable dispensing valve or faucet 48 through the Teflon tube 40 within which this water sits prior to opening of the valve 48. Thus, UV rays act on the water within the tube 48 while the water is in the tube and as the water flows therethrough, thereby insuring that the water remains substantially free of bacteria and effectively pure until the water has exited the dispenser. The water within the lower compartment 60 is chilled by the cooling coils 20 and remains substantially pure until dispensed through the dispensing valve 56. Furthermore, by placing the float switch 68 within a stainless steel shield so that it need not be outside of the dispenser, the water may enter the dispenser directly for fast refill, and by channeling or directing the incoming water directly on to the UV lamp bulb so that it may flow around and contact substantially the entire surface of the bulb in a laminar thin film, the exposure of the water to UV rays is greatly increased even during fast refill and dispensing. This aids in permitting a low wattage UV lamp and reduces the cooling refrigeration requirements for the cooled water.

Figure 4:
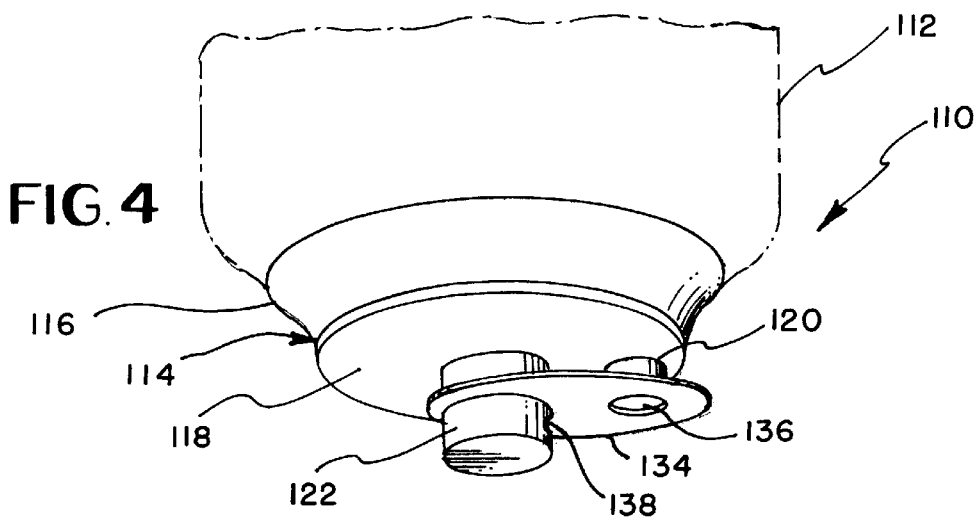
FIG. 4 is a fragmentary perspective view of the upper portion of a bottled water dispenser constructed in accordance with the principles of the present invention.

Referring to FIG. 4, it may be seen that the principles of the present invention may be used in conjunction with a bottled water adapter assembly 110. A bottle of water 112 may be mounted on an adapter 114 having a bottle receiving portion 116 within a plate 118 at the other end. The plate acts as or includes a UV bulb cover 120 and also includes a water outlet adapter conduit 122 into which the end of the bottle fits and which passes through and is fastened to a lid 134 which is used in lieu of the lid 34 in the embodiment illustrated in FIG. 1. The UV lamp bulb passes through an opening 136 in the lid with the top within the cover 120 and the remainder of the lamp bulb within the dispenser as illustrated and described in regard to the embodiment of FIG. 1. Here, the adapter conduit 122 is used in place of the inlet tube 62, the adapter conduit 122 having an outlet opening 138 permitting the water dispensed from the bottle 112 to be directed and to flow onto the UV lamp bulb 30 in the same manner as the bent portion 64 of the tube 62 in the dispenser illustrated in FIG. 1. Of course, a small tube (not illustrated) may extend out of the adapter conduit 122 and direct the water onto the bulb if desired. Thus, the principles of the invention may be applied to a bottled water dispenser.

Figure 5:
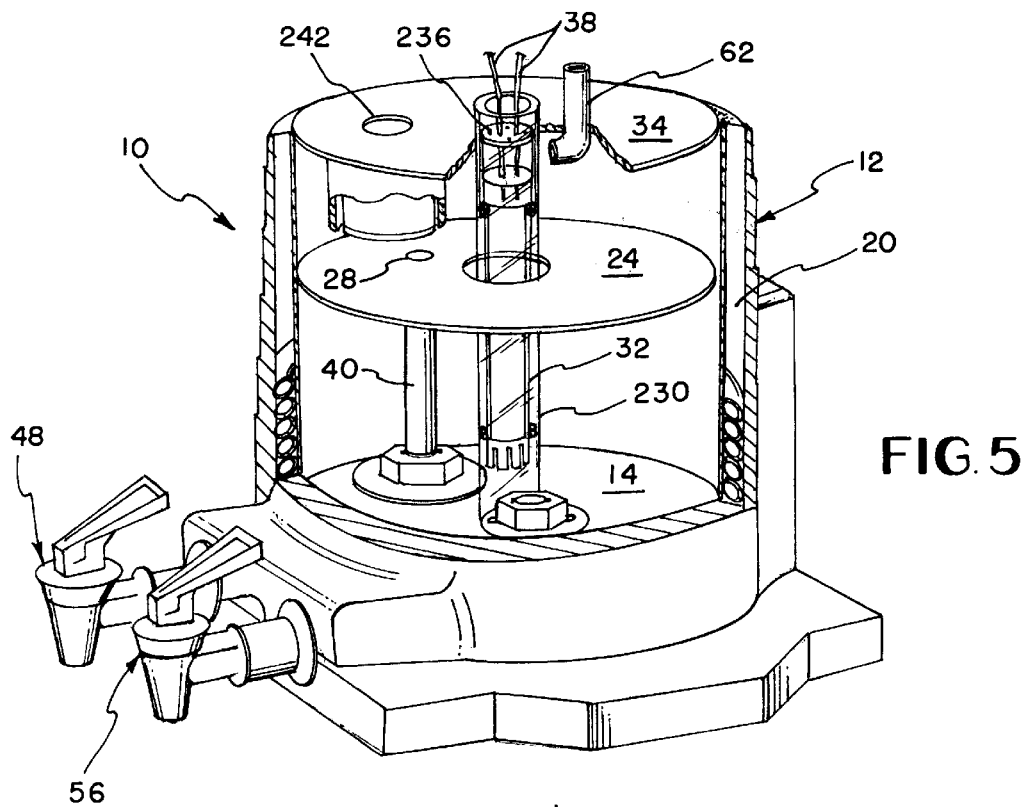
FIG. 5 is a view similar to FIG. 1, but of a modification of the construction illustrated therein.
Figure 6:
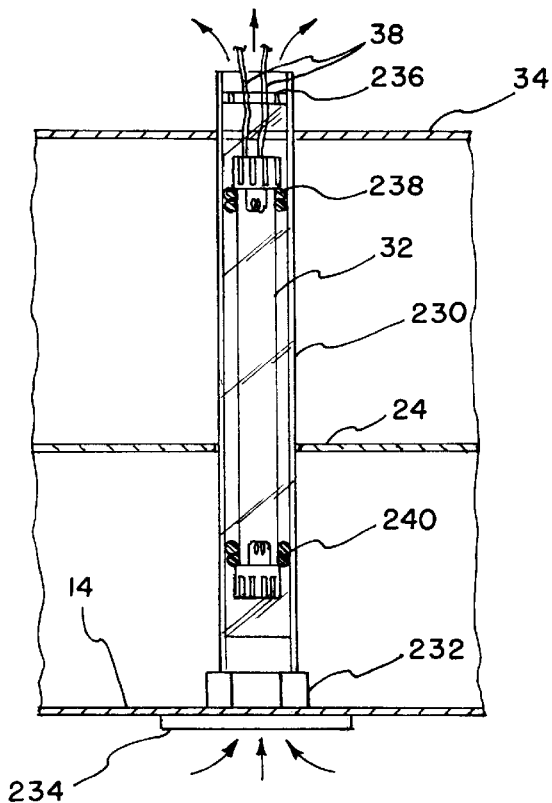
FIG. 6 is a fragmentary elevational view of a portion of the structure illustrated in FIG. 5 greatly enlarged relatively thereto.

The embodiment illustrated in FIG. 5 is substantially identical to that illustrated in FIG. 1, the major difference being that the UV lamp 32 rather than being mounted within a closed ended bulb 30 is mounted within a fused quartz or thin walled Teflon tube 230 which is open at both ends as illustrated in FIG. 6. The open end of the tube 230 at the bottom is fastened to a coupling such as a nut 232 at the base 14 which has a cooperating connecting member 234 below the surface of the base and attached thereto so that air under the base may enter the tube 230. The air flows between the lamp 32 and the tube 230 and exits at the top of the bulb above the lid 234 which, of course, alternatively may be the lid 134 in a bottled water system. The wiring 38 may extend through one or two perforated grommets 236 and a pair of spaced apart small coils of wire 238, 240 may position and stabilize the lamp 32 within the tube while permitting air to flow therebetween. This construction permits air to flow about the lamp 32 and be vented outside the dispenser thereby lowering the amount of heat transferred to the water. All elements within the dispenser again are either quartz, Teflon or stainless steel. Additionally, shown in FIG. 5, the vent tube 74 in the first embodiment may be eliminated and replaced by an internal vent air filter (not illustrated) within the float switch shield mounted through an opening 42 within a lid 34.

Figure 7:
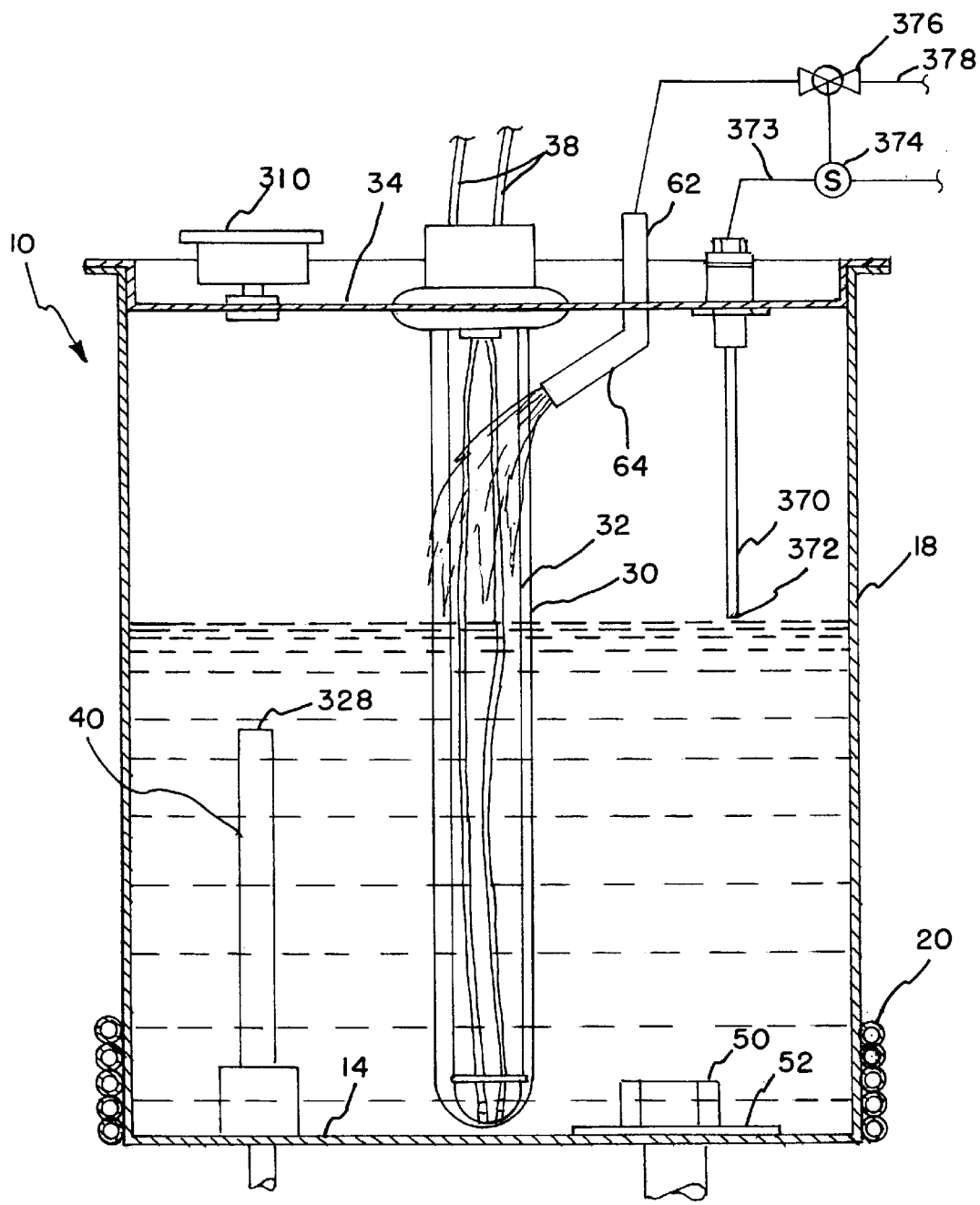
FIG. 7 is an elevational view, partly diagramatic, of another embodiment of a dispenser constructed in accordance with the principles of the present invention.

Another aspect of the present invention is illustrated in conjunction with FIG. 7. Here, the water entering the dispenser again enters through the bent portion 64 of the tube 62 and is directed onto the bulb 30 disposed about the ultra-violet lamp 32 to provide a 360 degree thin laminar flow of water about the bulb to transfer heat from the bulb and thus the lamp to the water and also to treat the incoming water with UV light rays. In this embodiment, however, there is no baffle plate to separate the chilled water from the room temperature water. Since the water is treated as it enters the dispenser, there is no reason to store room temperature water within the dispenser tank except to maintain a volume which allows immediate dispensing through the tube 40. The need for the baffle therefore may be eliminated. Moreover, the lower level of water in the dispenser requires that the lamp be turned on for only a shorter amount of time so that less heat is absorbed by the water thereby reducing the cooling load.

The level of the water within the dispenser must be above the upper open end 328 of the tube 40 in order to dispense room temperature water. This may be accomplished by using a probe 370 fastened to the lid 34 and projecting downwardly into the dispenser tank. The probe is a stainless steel member having an electrical conductivity sensing device 372 at its tip which is within the dispenser which detects when the water is at the level of the tip. The output of the probe is connected electrically by conductors 373 to a normally closed solenoid 374 of a solenoid valve 376 which is mounted in the water line 378 between a source of water and the tube 62. When the water level within the dispenser tank falls below the tip of the probe 370, the solenoid 374 opens the valve 376, and when the water is at the level of the tip, the solenoid shuts the valve to stop water flow. When the level of the water drops below the tip of the probe, after a fixed time delay to prevent rapid recycling of the solenoid when, for example, water is turbulent or disturbed, the solenoid is energized to activate the solenoid operated valve until the water again rises to the level of the tip of the probe. Also illustrated in FIG. 7 is an air filter 380 similar to the air filter which is used in conjunction with the embodiment of FIG. 5. In all other respects, the embodiment of FIG. 7 is substantially the same as that heretofore disclosed in regard to the other embodiments. For example, the open tube arrangement illustrated in FIG. 6 may be incorporated therein in the same manner and for the same purpose as that heretofore described.

It may be understood that the present invention may be applied in kit form to any conventional existing water dispensing system whether a filtered water system, a bottled water system, a distillation or reverse-osmosis purifying system by the inclusion of the UV lamp/bulb, the means for directing the inlet water onto the UV lamp/bulb and by the inclusion of a transparent tube of either quartz or Teflon to direct water to the outlet valve either through the baffle or by the system illustrated in regard to FIG. 7.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A water dispenser including a housing having a water treatment tank, a baffle separating said tank into upper and lower compartments, a water inlet feeding water into said upper tank, cooling coils acting to chill water in said lower compartment, an ultra-violet lamp disposed in both compartments extending through said baffle for transmitting ultra-violet light rays to water in both compartments to eliminate bacterial growth in both compartments, said water inlet feeding water directly onto an upper portion of said lamp in a manner providing a thin film laminar flow of water about said upper portion, a first faucet communicating with said lower compartment for dispensing chilled water selectively, a second faucet, and a supply conduit communicating water in said upper compartment with said second faucet for dispensing water which has not been chilled selectively.

2. A water dispenser as recited in claim 1, wherein said supply conduit comprises a transparent tube communicating with said upper compartment through said baffle for receiving water from said upper compartment and extending through said lower compartment to said second faucet.

3. A water dispenser as recited in claim 2, wherein said tube is formed from polytetrafluorethylene.

4. A water dispenser as recited in claim 1 wherein said water inlet comprises a tube bent to direct water onto said lamp.

5. A water dispenser as recited in claim 4, wherein water is supplied to said tube from a bottle of water, and an adapter including a plate disposed intermediate said bottle and said tube.

6. A dispenser as recited in claim 1, wherein said lamp is disposed within a bulb closed at the top and bottom thereof.

7. A dispenser as recited in claim 1, wherein said lamp is disposed in a bulb open at the top and the bottom, said bulb communicating at said top and bottom externally of said housing with ambient air to permit air to flow through said bulb about said lamp.

8. A water dispenser as recited in claim 7, wherein said bulb is formed from polytetrafluorethylene.

9. A water dispenser including a housing having a water treatment tank, a baffle separating said tank into upper and lower compartments, a water inlet member feeding water into said upper tank, cooling coils acting to cool water in said lower compartment, an ultra-violet lamp disposed in both compartments extending through said baffle for transmitting ultra-violet light rays to water in both compartments to eliminate bacterial growth in both compartments, a first faucet communicating with said lower compartment for dispensing chilled water, a second faucet, and a supply conduit comprising a transparent tube communicating water in said upper compartment with said second faucet for dispensing water which has not been chilled.

10. A dispenser as recited in claim 9, wherein said conduit communicates with said upper compartment through an apparature in said baffle, and extends through said lower compartment to said second faucet.

11. A dispenser as recited in claim 10, wherein said conduit is formed from polytetrafluorethylene.

12. A dispenser as recited in claim 9, wherein said lamp is disposed within a bulb closed at the top and bottom thereof.

13. A dispenser as recited in claim 9, wherein said lamp is disposed in a bulb open at the top and bottom, said bulb communicating with ambient air at said top and bottom externally of said housing to permit air to flow through said bulb around said lamp.

14. A water dispenser as recited in claim 13, wherein said bulb is formed from polytetrafluorethylene.

15. A water dispenser including a housing having a water treatment tank, a baffle separating said tank into upper and lower compartments, a water inlet feeding water into said upper tank, cooling coils acting to chill water in said lower compartment, an ultra-violet lamp disposed in both compartments extending through said baffle for transmitting ultra-violet light rays to water in both compartments to eliminate bacterial growth in both compartments, said bulb comprising a tube open at both ends, said bulb communicating with ambient air at each end externally of said housing, a first faucet communicating with said lower compartment for dispensing chilled water selectively, a second faucet, and a supply conduit communicating water in said upper compartment with said second faucet for dispensing water which has not been chilled selectively.

16. A water dispenser as recited in claim 15, wherein said supply conduit comprises a transparent tube communicating with said upper compartment through said baffle for receiving water from said upper compartment and extending through said lower compartment to said second faucet.

17. A water dispenser as recited in claim 16, wherein said conduit is formed from polytetrafluorethylene.

18. A water dispenser as recited in claim 15, wherein said bulb is formed from polytetrafluorethylene.

19. A water dispenser including a housing having a water treatment tank, a water inlet feeding water into an upper portion of said tank, cooling coils acting to chill water in a lower portion of said tank, an ultra-violet lamp disposed in said tank extending from said upper portion into said lower portion for transmitting ultra-violet light rays to water in said tank to eliminate bacterial growth therein, said water inlet feeding water directly onto an upper portion of said lamp in a manner providing a thin film laminar flow of water about said upper portion, a first faucet communicating with said lower portion for dispensing chilled water selectively, a second faucet, a supply conduit having an inlet spaced above said coils communicating water in said upper portion with said second faucet for dispensing water which has not been chilled selectively, and a water level controller controlling the level of the water in said tank to a level above the inlet of said supply conduit.

20. A water dispenser as recited in claim 19 wherein said conduit comprises a transparent tube.

21. A water dispenser as recited in claim 20, wherein said tube is formed from polytetrafluorethylene.

22. A water dispenser as recited in claim 19, wherein said water inlet comprises a tube bent to direct water onto said lamp.

23. A water dispenser as recited in claim 19, wherein said lamp is disposed in a bulb open at the top and the bottom, said bulb communicating at said top and bottom externally of said housing with ambient air to permit air to flow through said bulb about said lamp.

24. A water dispenser as recited in claim 23, wherein said bulb is formed from polytetrafluorethylene.

\* \* \* \* \*